US008698365B2

(12) United States Patent
Hull et al.

(10) Patent No.: US 8,698,365 B2
(45) Date of Patent: Apr. 15, 2014

(54) LIGHTWEIGHT COMPOSITE SAFETY CONTAINMENT FOR FLYWHEEL ENERGY STORAGE

(75) Inventors: John R. Hull, Sammamish, WA (US); John A. Mittleider, Kent, WA (US); Michael Strasik, Sammamish, WA (US)

(73) Assignee: The Boeing Company, Chicago, IL (US)

( * ) Notice: Subject to any disclaimer, the term of this patent is extended or adjusted under 35 U.S.C. 154(b) by 189 days.

(21) Appl. No.: 13/438,279

(22) Filed: Apr. 3, 2012

(65) Prior Publication Data
US 2013/0255437 A1 Oct. 3, 2013

(51) Int. Cl.
H02K 7/02 (2006.01)

(52) U.S. Cl.
USPC .......................................... 310/74; 74/572.11

(58) Field of Classification Search
CPC ........... Y02E 60/16; H02K 7/025; H02K 7/09
USPC ......... 310/74, 90.5; 74/572.1, 572.11, 572.12
See application file for complete search history.

(56) References Cited

U.S. PATENT DOCUMENTS

| | | | | |
|---|---|---|---|---|
| 4,675,221 A | * | 6/1987 | Lalikos et al. | 138/110 |
| 5,012,694 A | * | 5/1991 | McGrath | 74/572.11 |
| 5,214,981 A | | 6/1993 | Weinberger et al. | |
| 5,760,506 A | | 6/1998 | Ahlstrom et al. | |
| 6,182,531 B1 | * | 2/2001 | Gallagher et al. | 74/572.11 |
| 6,204,589 B1 | * | 3/2001 | Cascio | 310/261.1 |
| 6,688,191 B2 | * | 2/2004 | Canders | 74/572.11 |
| 6,873,235 B2 | | 3/2005 | Fiske et al. | |
| 7,263,912 B1 | * | 9/2007 | Gabrys et al. | 74/572.21 |
| 2001/0003900 A1 | * | 6/2001 | Canders | 60/721 |
| 2010/0231075 A1 | | 9/2010 | Han et al. | |

OTHER PUBLICATIONS

Ashley S. et al. "Designing Safer Flywheels," Mechanical Engineering, 1996, vol. 118, No. 11, pp. 88-91.
Barber, A.H. et al., "Stochastic Strength of Nanotubes: An Appraisal of Available Data," Composites Science and Technology, 2005, vol. 65, pp. 2380-2384.
Basinger, S.A., et. al. "Amplitude-Dependence of Magnetic Stiffness in Bulk High-Temperature Superconductors," Appl. Phys. Lett., 1990, vol. 57, pp. 2942-2944.Bradford, P.D.
Cebeci, H., et. al., "Multifunctional Properties of High Volume Fraction Aligned Carbon Nanotube Polymer Composites With Controlled Morphology," Composites Science and Technol, 2009.
Chae, H.G., et al., "Stabilization and Carbonization of Gel Spun Polyacryolonitrile/Single Wall Carbon Nanotube Composite Fibers," Polymer, 2007, vol. 48, pp. 3781-3789.
Chae, H.G., et al., "Making strong fibers," Science, 2008, vol. 319, pp. 908-909.
Coleman, J.N., et al., "Small But Strong: A Review of the Mechanical Properties of Carbon Nanotube-Polymer Composites," Carbon, 2006, vol. 44, pp. 1624-1652.

(Continued)

Primary Examiner — Nguyen N Hanh
(74) Attorney, Agent, or Firm — Smith Moore Leatherwood LLP (57) ABSTRACT

Apparatuses are disclosed and directed to a substantially cylindrical containment layer, and methods for containment, for a flywheel apparatus comprising a plurality of predictably deformable brackets oriented to contain an impact. The brackets each have a plurality of layers and a surface for absorbing an impact, with the surface providing a glancing angle in the direction of an impact of from about 0.1° to about 5°.

26 Claims, 7 Drawing Sheets

(56) References Cited

OTHER PUBLICATIONS

Cumings, J. and Zettl, A., "Low-Friction Nanoscale Linear Bearings From Multiwall Carbon Nanotubes," Science, 2000, vol. 289, pp. 602-604.

Dumitrica, T., et al., "Selective Cap Opening in Carbon Nanotubes Driven by Laser-Induced Coherent Phonons," Physical Review Letters, 2004, vol. 92, No. 11.

Huhtala, M., et al., "Improved Mechanical Load Transfer Between Shells of Multiwalled Carbon Nanotubes," Physical Review B, 2004, vol. 70, 045404.

Hull, J.R., et al., "Velocity Dependence of Rotational Loss in Evershed-Type Superconducting Bearings," Appl. Phys. Lett., 1997, vol. 70, pp. 655-657.

Hull, J.R. "Superconducting Levitation," Encyclopedia of Electrical and Electronics Engineering, 1999, vol. 20, pp. 729-734 (ed. J. G. Webster), John Wiley and Sons, New York.

J. Hull, "Superconducting Bearings," Supercond. Sci. Technol., 2000, vol. 13, pp. R1-R14.

Hull, J.R. and Murakami, M., "Applications of Bulk High-Temperature Superconductors," Proceedings IEEE, 2004, vol. 92, pp. 1705-1718.

Hull, J.R., "Levitation Applications of High-Temperature Superconductors," High Temperature Superconductivity 2: Engineering Applications, ed. A V. Narlikar, Springer, Berlin.

Hull, J., et al., "High Rotational-Rate Rotors With High-Temperature Superconducting Bearings," IEEE Trans. Appl. Supercond., 2009, vol. 19, pp. 2078-2082.

Jia, J., et al., "A Comparison of the Mechanical Properties of Fibers Spun From Different Carbons Nanotubes," Carbon, 2011, vol. 49, pp. 1333-1339.

Jiang, B., et al., "Maximum Nanotube Volume Fraction and Its Effect on Overall Elastic Properties of Nanotube-Reinforced Composites," Composites: Part B, 2009, vol. 40, pp. 21.

Mora, R.J., et al., "Properties of Composites of Carbon Nanotube Fibres," Composites Science and Technology, 2009, vol. 69, pp. 1558-1563.

Mulcahy, T.M., et al., "Test Results of 2-kWh Flywheel Using Passive PM and HTS Bearings," IEEE Trans. Appl. Supercond., 2001, vol. 11, pp. 1729-1732.

Pantano, A., et al., "Mechanics of Deformation of Single- and Multi-Wall Carbon Nanotubes," J. Mechanics and Physics of Solids, 2004, vol. 52, pp. 789-821.

Pathak, S.K., et al., "Fabrication of High Performance Y-123/Y-2411l/Ag Single Grain Composites," Physica C, 2009, vol. 469, pp. 1173-1176.

Pathak, S.K., et al., "Processing and Properties of Large Grain Y—Ba—Cu—O Containing Y2Ba4CuWOY (Y-24W1) and Ag Second Phase Inclusions," J. Appl. Phys., 2009, vol. 106, 06392.

Sammalkorpi, M., et al., "Mechanical Properties of Carbon Nanotubes With Vacancies and Related Defects," Physical Review B, 2009, vol. 70, 245416.

Shokrieh, M.M. and Rafiee, R., "Investigation of Nanotube Length Effect on the Reinforcement Efficiency in Carbon Nanotube Based Composites," Composite Structures, 2010, Vol.

Strasik, M., et al., "Design, Fabrication, and Test of a 5-kWh/100-kWh Flywheel Energy Storage Utilizing a High-Temperature Superconducting Bearing," IEEE Trans. Appl. Superc, 2007

Strasik, M., et al., "Performance of a Conduction-Cooled High-Temperature Superconducting Bearing," Mat. Sci. Eng. B, 2008, vol. 151, pp. 195-198.

Strasik, M., et al., "Overview of Boeing Flywheel Energy-Storage Systems With High-Temperature Superconducting Bearings," Supercond. Sci. Technol., 2010, vol. 23, 034021.

Strubhar, J.L., et al., "Lightweight Containment for High-Energy Rotating Machines," IEEE Trans. Magn., 2003, vol. 39, pp. 378-383.

Sun, X. and Zhao, W., "Prediction of Stiffness and Strength of Single-Walled Carbon Nanotubes by Molecular-Mechanics Based Finite Element Approach," Materials Sciene and Engi, 2004.

Švrček, V., et al., "Filling and Capping Multiwall Carbon Nanotubes With Silicon Nanocrystals Dispersed in SiO2-Based Spin on Glass," J. Appl. Phys., 2006, vol. 99 064306.

Unger, R. and Keiter, D., "The Development of Cryotel™ Family of Coolers," AIP Conf. Proc. 2004, vol. 719, pp. 1404-1409.

Wardle, B.L., et al., "Fabrication and Characterization of Ultrahigh-Volume-Fraction Aligned Carbon Nanotube-Polymer Composites," Adv. Mater., 2008, vol. 20, pp. 2707-2714.

Wei, C., et al., "Tensile Strength of Carbon Nanotubes Under Realistic Temperature and Strain Rate," Physical Review B, 2003, vol. 67, 115407.

Weinberger, B.R., et al., "Low Friction in High Temperature Superconductor Bearings," Appl. Phys. Lett., 1991, vol. 59, pp. 1132-1134.

Yakobson, B.I., et al., "High Strain Rate Fracture and C-Chain Unraveling in Carbon Nanotubes," Computational Materials Science, 1997, vol. 8 pp. 341-348.

Yu, M., et al., "Strength and Breaking Mechanism of Multiwalled Carbon Nanotubes Under Tensile Load," Science, 2000, vol. 287, p. 637.

Yu, M., et al., "Controlled Sliding and Pullout of Nested Shells in Individual Multiwalled Carbon Nanotubes," J Phys. Chem. B, 2000, vol. 104, pp. 8764-8767.

Zhang, X., et al., "Ultrastrong, Stiff, and Lightweight Carbon-Nanotube Fibers," 2007, Adv. Mater., vol. 19, pp. 4198-4201.

Zhang, Y., et al., "Tailoring the Morphology of Carbon Nanotube Arrays: From Spinnable Forests to Undulating Foams," 2009, ACSNano, vol. 3, pp. 2157-2162.

Zhang, Y., et al., "Polymer-Embedded Carbon Nanotube Ribbons for Stretchable Conductors," 2010, Adv. Mater., vol. 22, pp. 3027-3031.

Zhao, H., et al., "Carbon Nanotube Yarn Strain Sensors," 2010, Nanotechnology, vol. 21, 305502.

Bradford, P.D., et al., "A Novel Approach to Fabricate High Volume Fraction Nanocomposites With Long Aligned Carbon Nanotubes," Compo Sci. Technol., 2010, vol. 70, pp. 1980-1919.

\* cited by examiner

See FIG 2c

LIGHTWEIGHT COMPOSITE SAFETY CONTAINMENT FOR FLYWHEEL ENERGY STORAGE

TECHNOLOGICAL FIELD

The present disclosure relates to flywheel energy storage devices and, more particularly, to flywheel storage devices having improved stability, performance and containment capacity.

BACKGROUND

Flywheel energy storage devices and systems are known for storing energy and releasing stored energy on demand. Known flywheel assemblies have a traditional rotor design sometimes made with carbon fiber composites. Such rotors have a shaft on which the motor/generator (M/G) and bearing permanent magnets (PMs) are mounted. The shaft is conventionally connected to the rim via a hub. The shaft-and-hub flywheel design is limited in terms of its achievable upper-end velocity. Matching useable materials for components in the flywheel assembly has been problematic since the radial growth of the components varies as the rotor velocity increases. The hub must mechanically couple the shaft to the rim without introducing bending modes into the rotor structure through the range of operating frequencies in the operating speed range of the flywheel. However, the shaft often exhibits negligible radial growth while the rim exhibits significant radial growth.

The higher speeds for flywheels enabled by the use of ever-advancing materials unfortunately exacerbates the growth-matching problem for the hub as the increased radial growth of the rim outpaces any growth exhibited by other connected components such as, for example, the connecting shaft. Further, the overall efficiency afforded by flywheel technology is limited by the presently available materials that fail when the flywheel is run at speeds that exceed material tolerances.

In addition, while a high energy density is desired to achieve the maximum energy storage and deployment, the energy density that is achievable in known flywheel assemblies is limited. Further, it is often difficult to reach a flywheel system's energy storage and deployment maximum capacity due to the existence of net angular momentum, and space restrictions often prohibit the usefulness of flywheel technology.

BRIEF SUMMARY

According to the present disclosure is directed to a containment layer for a flywheel apparatus comprising a substantially cylindrical chamber having an inner and outer wall and a plurality of deformable brackets attached to at least one of the inner and outer chamber wall. The brackets each have at least one surface for containing an impact providing a glancing angle in the direction of an impact of from about 0.1° to about 5°, with the brackets preferably each comprising multiple layers. Preferably, at least one layer comprises ablative particles. The brackets are preferably oriented to absorb and contain an impact and predictably deform. Preferably, the brackets are made from a material, such as, for example, a carbon-fiber-containing, glass-fiber containing, metal-containing material, or combinations thereof. The brackets preferably initially deform at a rate less than the velocity of the fastest flywheel debris, with a complete deformation of several centimeters occurring in a period of from about 1 to about 10 ms. The brackets have a preferred tensile strength of from about 2 GPa to about 20 GPa, and preferably each bracket has an S-shape, comprises a plurality of layers, and comprises a midsection that plastically deforms in the radially outward direction in response to an outward traveling impact to create a concave interior surface. Preferably, at least one layer comprises ablative particles. Upon confronting a force or impact that begins to deform the brackets, the containment layer deforms to create a substantially toroidal cavity.

Further, the present disclosure is directed to a flywheel assembly for storing and releasing energy comprising a substantially cylindrical rotor assembly within a vacuum chamber. The assembly comprising a rotor having an inner and outer surface, preferably comprises a carbon-fiber-containing, glass-fiber-containing, metal-containing material, etc., and combinations thereof. A stator assembly is positioned in close proximity to the rotor assembly. At least one rotor magnet that is preferably flexible is affixed to the inner surface of the rotor, and at least one stator magnet is affixed to the stator. A containment layer substantially surrounds the rotor assembly, and comprises a plurality of deformable brackets oriented to absorb and contain an impact. The brackets preferably comprise multiple layers with at least one layer preferably comprising ablative particles.

The rotor assembly may be of any desired architecture, including, for example, shaft-and-hub, hubless, open-core architectures, etc. The brackets each have a surface for absorbing an impact at a glancing angle in the direction of an impact of from about 0.1° to about 5°. The brackets preferably are S-shaped, but could be any geometric shape that affords the advantages set forth herein, and comprise a midsection that plastically deforms in the radially outward direction in response to an internal (outward) or external (inward) impact. When responding to an internal (outward) impact, the brackets deform to create a concave interior surface and a substantially toroidal cavity.

Still further, the present disclosure is directed to a method for containing flywheel rotor debris from a damaged flywheel assembly during operation comprising the steps of providing a substantially cylindrical flywheel rotor assembly and flywheel stator assembly within a vacuum chamber. At least one rotor magnet is affixed to the inner surface of each rotor, and at least one stator magnet is attached to each stator. A containment layer is provided to the flywheel system that substantially surrounds the rotor assembly. The containment layer comprises a plurality of deformable brackets oriented to absorb and otherwise contain an impact. The brackets preferably comprise a plurality of layers, with at least one layer comprising ablative particles. Each bracket preferably has a surface for absorbing and otherwise containing an impact by having a glancing angle in the direction of an impact of from about 0.1° to about 5°.

As stated above, the present disclosure is directed to shaft-and-hub type flywheels as well as open-core flywheels. The flywheel storage system may use, for example, mechanical bearings, active magnetic bearings, or superconducting bearing, etc., and multiple rotors comprising high-strength materials, such as, for example, carbon-fiber, glass-fiber, metal, etc., as well as oriented multi-strand carbon nanotube (CNT)-containing materials including multi-walled carbon nanotube-containing materials (MWCNTs). The desired properties inherent in the fabricated rotors result in significantly improved flywheel performance in terms of significantly increased speed, increased power storage/generation and increased system durability.

A vacuum chamber contains one or more rotating fiber-composite-containing rotor rings or cylinders, with each rotor operating as an independent flywheel. Preferably, a small turbo-molecular or getter-sublimation pump maintains the vacuum inside the chamber containing the entire assembly.

BRIEF DESCRIPTION OF THE DRAWING(S)

Having thus described variations of the disclosure in general terms, reference will now be made to the accompanying drawings, which are not necessarily drawn to scale, and wherein:

DETAILED DESCRIPTION

When protecting the flywheel assembly from external threats, the containment device, according to the present disclosure must prevent ballistic penetration as well as lightning protection, for example. Regarding containment of debris exploding out of the flywheel assembly, for example, in the event of a catastrophic flywheel failure, etc., the present disclosure is directed to novel solutions. Instead of fracturing into pie-shaped pieces in the manner of steel flywheels, failing flywheels made from composite-containing materials produce a composite ring of circumferentially-wrapped fibers that break into small shards and pieces having a distribution of sizes ranging from several microns to several millimeters. The conglomerate debris cloud formed from these shards and pieces extends as if the debris was a viscous liquid. The present disclosure provides new flywheel designs and flywheel containment designs, along with higher-strength materials to effect a more certain and protective containment for flywheel operational safety.

According to one preferred variation of the present disclosure, a preselected orientation of a series of S-shaped vanes extend inward from a rigid outer wall of a containment chamber, and, optionally outward from an inner wall. The inner edges of the brackets are close to the outer rim of the flywheel rotor assembly, so that, at failure, the outermost and fastest moving part of the debris cloud impinges on these brackets at a "glancing" angle of from about 0.1° to about 5°, thereby "softening" the initial impact and significantly mitigating shock waves. As the pressure from the debris cloud builds up, the S-brackets are deliberately and predictably configured and positioned in such a way as to possess sufficient ductility to adequately flatten through non-destructive plastic deformation and contain the high-energy material fragments of a failed flywheel.

The hollow cells formed by the shaped elements plastically deform (or bend) at a rate fast enough to prevent the elements from experiencing ultimate tensile failure (rupture) or localized compression failure (buckling). The S-brackets preferably have an axial height that is greater than that of the flywheel rotor. The S-brackets have midsections that are designed to plastically deform in the radially outward direction in response to impact from failed flywheel fragments in a manner that intentionally and predictably creates a concave interior surface. This concave surface then acts to prevent axial dispersion of diverted flywheel material fragments; i.e. the debris cloud keeps circulating circumferentially in a substantially toroidal cavity formed by the deformed brackets. The plastic deformation of the shaped inner elements occurs quickly enough to significantly extend the total impact time interval and thus reduce the peak force that must be absorbed by the containment elements. It is understood that the brackets are shaped and oriented circumferentially such that they will deform radially outward (from an internal flywheel assembly failure) to form the substantially toroidal shape of the stricken containment chamber.

Figure 2:
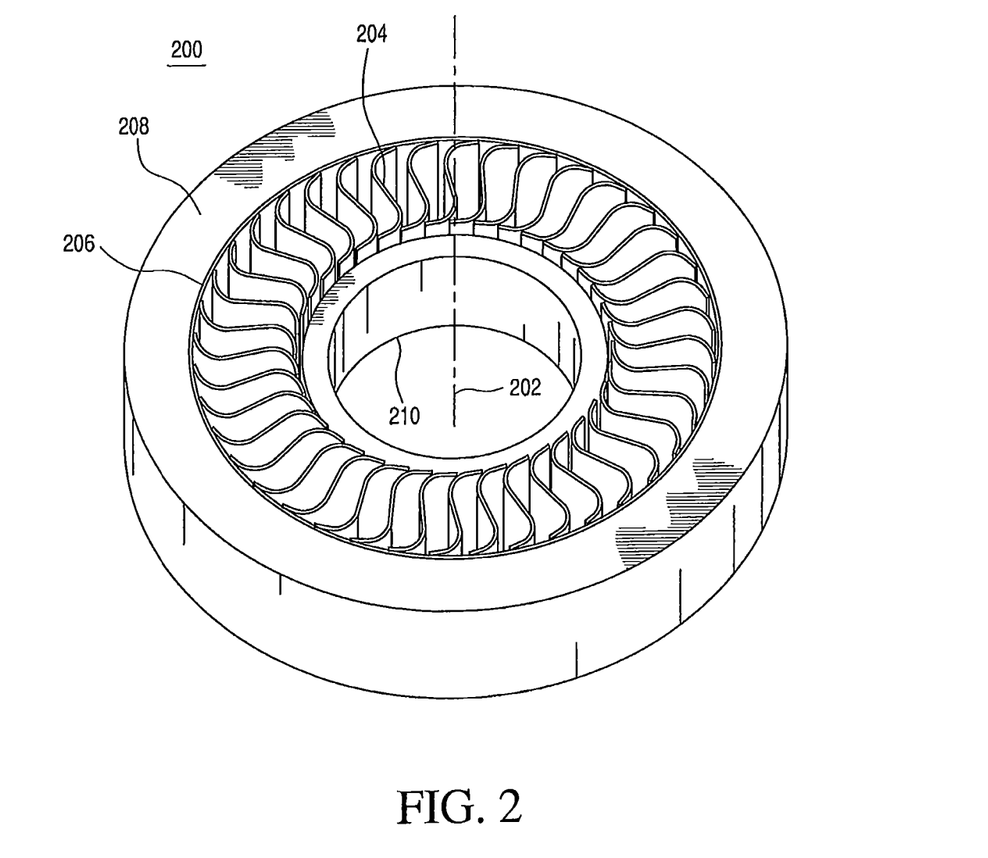
FIG. 2 shows a partial cross-sectional view of a containment structure according to the present application.

In earlier flywheel containment designs, the S-bracket material was stainless steel. According to variations of the present disclosure, the S-brackets preferably comprise a composite-containing material designed to stretch out the pressure wave and absorb the energy of the impact. A chain-and-braid design for a matrix composite, as shown in FIG. 2, allows the composite material to initially deform and absorb energy by compression of the matrix material as the chain links expand. As debris engages the S-brackets, the links of the chain in the chain- and braid design initially move and the chain expands outwardly (in the direction in which the debris is moving). As the expansion continues, the ends of the links touch and begin to pull on each other. Eventually the chain links "lock-up" and further expansion occurs by stretching the links and brackets themselves. By constructing the links from woven CNT-containing fiber/fabric material, the stress-strain relation of the chain links is much higher than that of presently known materials.

The performance of the chain links can be further enhanced by placing a viscous, for example, waxy material in the open spaces bounding the links. When the links expand and ends of the adjacent links move toward each other, the links move through the viscous material and extrude it. The viscous force between the viscous material and the links will heat the viscous material and change some of the kinetic energy of the links into heat. Materials, such as, for example dilatants (shear thickening) fluids, can be used to help strengthen and improve the performance of this part of the containment structure. Possible fluids include, but are not limited to, the combination of silicone oil and boric acid, silica nano-particles dispersion in a solution of poly(ethylene glycol) (PEG), and commercially available shear thickening fluids.

In addition, hard, ablative and energy-absorbing particles can be incorporated and located at appropriate parts of the structure such as, for example, on the inward-facing surface so that the hard particles form the surface of first impact to break up any fiber shards from the flywheel rotor into a more dust-like substance. Ideally, these particles take the form of mm-sized plates that substantially conform to the surface of the S-brackets where the S-brackets are exposed to the inside of the vacuum chamber. These plates are preferably made from hard ceramics such as, for example, alumina-, silicon-carbide-, and boron-carbide-containing materials, etc.

For very high energy-density flywheels with rim velocities greater than 1000 m/s, containing the energy of a burst rotor will be exacerbated by the thermal heating of the rotor debris, which will heat the chamber walls and may be a problem during and even after the debris loses its velocity. Therefore, further variations contemplate enclosing the mechanical containment by a thermal insulation, such as, for example, firebrick material, etc. It is also contemplated that some of the vaporized and hot material will be safely vented to the atmosphere in a controlled manner, such as, for example, via a pressure release feature.

One particularly preferred material for use in containment fabrication are carbon nanotubes (CNTs). CNTs are allotropes of carbon with a cylindrical nanostructure. Nanotubes have been constructed with length-to-diameter ratio of up to 132,000,000:1, significantly larger than for any other material. These cylindrical carbon molecules have unusual properties that are valuable for nanotechnology, electronics, optics and other fields of material science and technology. Because of their thermal conductivity and mechanical and electrical properties, carbon nanotubes find applications as additives to various structural materials. Nanotubes are categorized as single-walled nanotubes (SWNTs) and multi-walled nanotubes (MWNTs). Individual nanotubes naturally align themselves into "ropes" held together by van der Waals forces, more specifically, pi-stacking.

CNTs are among the strongest and stiffest materials yet discovered in terms of tensile strength and elastic modulus respectively. This strength results from the covalent $sp^2$ bonds formed between the individual carbon atoms. A multi-walled carbon nanotube (MWCNT) was tested to have a tensile strength of 63 gigapascals (GPa). For illustration, this translates into the ability to endure tension of a weight equivalent to 6422 kg on a cable with cross-section of about 1 mm$^2$. Individual CNT shells have strengths of up to about 100 GPa. Since carbon nanotubes have a low density for a solid of from about 1.3 to about 1.4 g/cm$^3$, their specific strength of up to about 48,000 kN·m·kg$^{-1}$ is the best of known materials, compared to, for example, high-carbon steel at about 154 kN·m·kg$^{-1}$.

Although the strength of individual CNT shells is extremely high, weak shear interactions between adjacent shells and tubes leads to significant reductions in the effective strength of multi-walled carbon nanotubes and carbon nanotube bundles down to only a few GPa's. However, applying high-energy electron irradiation, which crosslinks inner shells and tubes, effectively increases the strength of these materials to about 60 GPa for multi-walled carbon nanotubes and about 17 GPa for double-walled carbon nanotube bundles.

Standard single-walled carbon nanotubes (SWCNTs) can withstand a pressure up to about 24 GPa without deformation. They then undergo a transformation to superhard phase nanotubes. Maximum pressures measured using current experimental techniques are about 55 GPa. However, these new superhard phase nanotubes collapse at an even higher, albeit unknown, pressure.

Multi-walled carbon nanotubes (MWCNT) have multiple concentric nanotubes precisely nested within one another. These CNTs exhibit a striking telescoping property whereby an inner nanotube core may slide, almost without friction, within its outer nanotube shell, thus creating an atomically perfect linear or rotational bearing. MWCNT yarns having a density of about 0.2 gm/cm$^3$ are believed to yield a conservative minimal material strength of at least about 45 GPa, for twist-free composite structures.

One preferred process for manufacture of the CNTs used in the present disclosure involves depositing a thin layer (approximately 1 nm thick) of Fe catalyst film on a buffer layer of $Al_2O_3$ (approximately 10 nm thick) deposited on a layer of $SiO_2$ (about 1 micron thick) that coats a silicon wafer. Ethylene is provided as a preferred carbon source in an argon carrier gas (about 6% Hs). CNTs are then preferably grown in a continuous process at about 750° C. to produce CNTs longer than about 1 cm. This gives the fabricated material an aspect ratio (length/diameter) greater than about 100,000 and is adequate to transfer stress from one fiber to another.

The preferred CNTs for used in the fabrication of the novel rotors of the present disclosure preferably have a physical wall thickness of about 0.075 nm, and an effective wall thickness of about 0.34 nm with a physical wall strength of from about 150 to about 260 GPa. This provides a preferred material having volume fractions of up to about 65% of 30 nm diameter MWCNTs with metallic, glassy and/or polymeric matrices. Inducing defects into the MWCNTs is believed to improve inter-wall strength to improve mechanical load transfer between the MWCNT strands to inner strand "walls" by a factor of about 2.

The preferred CNTs used in the present disclosure are specifically formulated by controlling the degree of orientation and volume fraction in a matrix to afford the finished composite material and product desired physical properties (such as, for example, higher rotor tensile strengths) than are presently known.

Some variations of the present disclosure will now be described more fully hereinafter with reference to the accompanying drawings, in which some, but not all variations of the disclosure are shown. Indeed, the present disclosure may be embodied in many different forms and should not be construed as limited to the variations set forth herein. Instead, these illustrative variants are provided so that this disclosure will be thorough and complete, and will fully convey the scope of the disclosure to those skilled in the art. For example, unless otherwise indicated, referencing something as being a first, second or the like should not be construed to imply a particular order. Also, something may be described as being "above" something else and, unless otherwise indicated, may instead be "below", and vice versa. Similarly, something described as being to the left of something else may instead be to the right, and vice versa. Like reference numerals refer to like elements throughout.

Figure 1A:
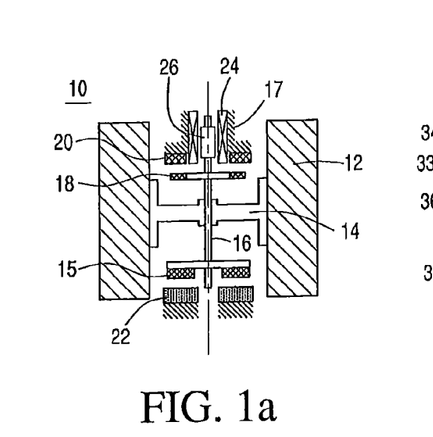
FIG. 1(a) shows a cross-sectional view of a prior art shaft-and-hub flywheel assembly.

FIG. 1(a) shows a cross-sectional view of a traditional shaft-and-hub flywheel assembly 10 that displays limited performance at, for example, various frequencies and higher speeds. A fiber-composite rim rotor 12 is attached to hub 14 that, in turn, is attached to shaft 16. Attached to shaft 16, sintered permanent magnets (PMs) 15, and 18 exert attractive and repulsive forces on a lift PM 20 and a high temperature superconductor 22. PM 20 is shown attached to support 17. A stator coil 24 from the motor/generator (M/G) is shown suspended between the M/G PM 26 and support 17.

Figure 1B:
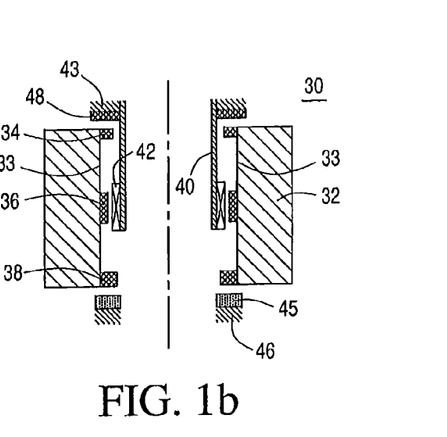
FIG. 1(b) shows a cross-sectional view of an open-core flywheel assembly.

FIG. 1(b) shows a cross-sectional view of a flywheel architecture 30 made according to the present disclosure. In this "hubless" open-core flywheel architecture (with dot-dashed line indicating a centerline), elastic permanent magnets (PMs) 34, 36 and 38 are shown affixed to a fiber-composite rim rotor 32. Lift bearing stator PM 48 and stator coil 42 from the motor/generator (M/G) are attached to support structure 43. High temperature superconductor (HTS) 45 is positioned proximate to support 46. PMs 48 and 34 comprise the lift bearing, and elements 45 and 38 comprise the stability bearing.

The open-core architecture of the present disclosure presents a novel design that enables the fiber-composite rim and the HTS bearing to achieve maximum performance without the design limitations of component radial growth disparities inherent in the shaft-and-hub flywheel design. It is understood that the entire open-core flywheel 30 in its shown vertical orientation, is contained within a vacuum chamber (not shown). In a preferred vertical orientation, the ring-shaped fiber-composite rotor 32 is preferably suspended by a passively stable magnetic bearing, comprising a lift bearing (PM 48 and PM 34) at one end or "top" and a HTS stability bearing (PM 36 and HTS 45) at a second end, or "bottom". Preferably, a brushless PM motor/generator 40 delivers power in and out of the rotor. As shown in FIG. 1(*b*), the rotor PMs 34, 36 and 38 are positioned along the inner surface of the rotor 32. The coldhead of a small cryocooler (not shown) thermally conducts to the HTS 45 to maintain a desired temperature of from about 30 K to about 90 K, and preferably about 60 K. A small turbo-molecular or getter-sublimation pump (not shown) maintains the vacuum inside the chamber.

FIG. 2 shows a partial cross-sectional view of the general containment structure 200 with a representative flywheel. The structure is substantially concentric about a centerline 202. The containment comprises a plurality of S-brackets 204, a vacuum liner 206, and an outer armor layer 208. Each S-bracket 204 is attached to the inner surface of vacuum liner 206. Flywheel 210 is positioned within the innermost ends of the S-brackets 204. The height of the flywheel 210 is preferably less than the height of the S-brackets 204. The outer armor layer 208 is designed to keep external projectiles from penetrating the vacuum liner inwardly. Outer armor layer 208 preferably comprises substantially concentric layers of steel, ceramic, Kevlar®, etc. The outer armor layer 208 may also consist of honeycomb and other porous geometries comprising laminations of steel, ceramics, Kevlar®, etc.

Figure 2A:
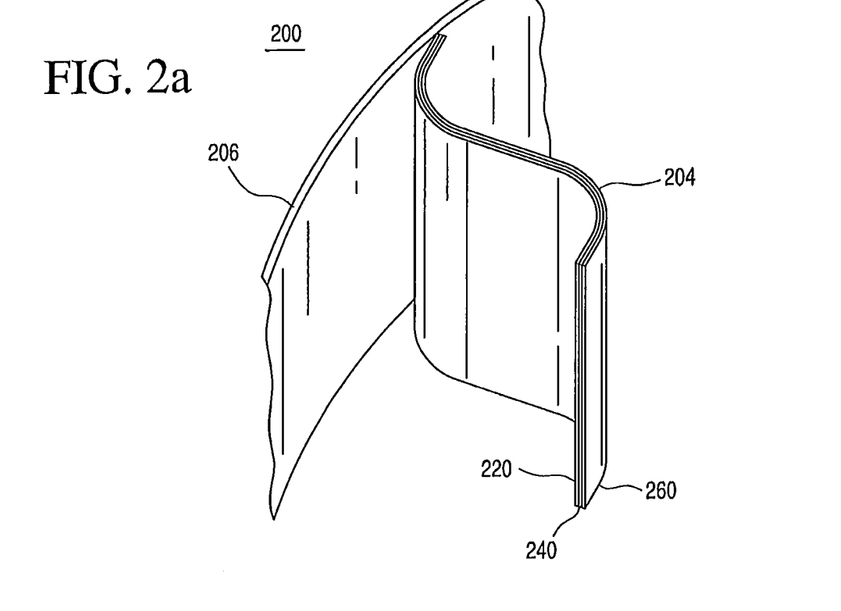
FIG. 2a shows an enlarged, close-up view of an individual S-bracket showing three composite layers.
Figure 2B:
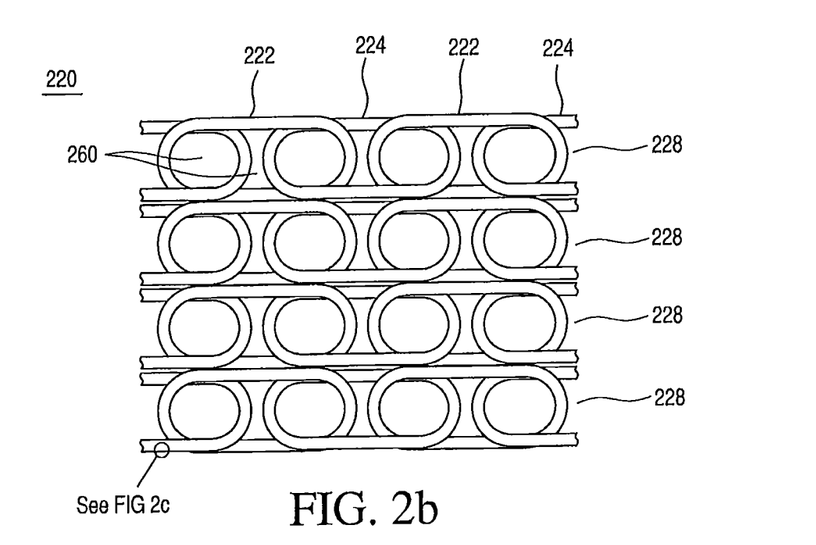
FIG. 2b shows an enlarged, close-up view of a component layer of an S-bracket.

According to one variation, an individual S-bracket 204 preferably comprises layers as shown in FIG. 2*a*. S-bracket 204 comprises three (3) layers: first layer 220, second (middle) layer 240, and third layer 260. A portion of first layer 220 is depicted in further detail in FIG. 2*b*. A first set of links 222 is shown that are substantially in the same plane, along with a second set of links 224 that are oriented at an angle to the plane of the first set of links 222. Each link 222 links with two adjacent links 224, and each link 224 links with two adjacent links 222. The space 226 between the links is preferably filled with a plastic material such as, for example, nylon, polyethylene, etc. Space 226 could also be filled with a shear thickening fluid as discussed above. Taken together, the joined links, plastic material and fluids form a row 228, and a stack of rows 228 form the layer 220. An individual layer 220 may have one or more layers of stacked rows.

Figure 2C:
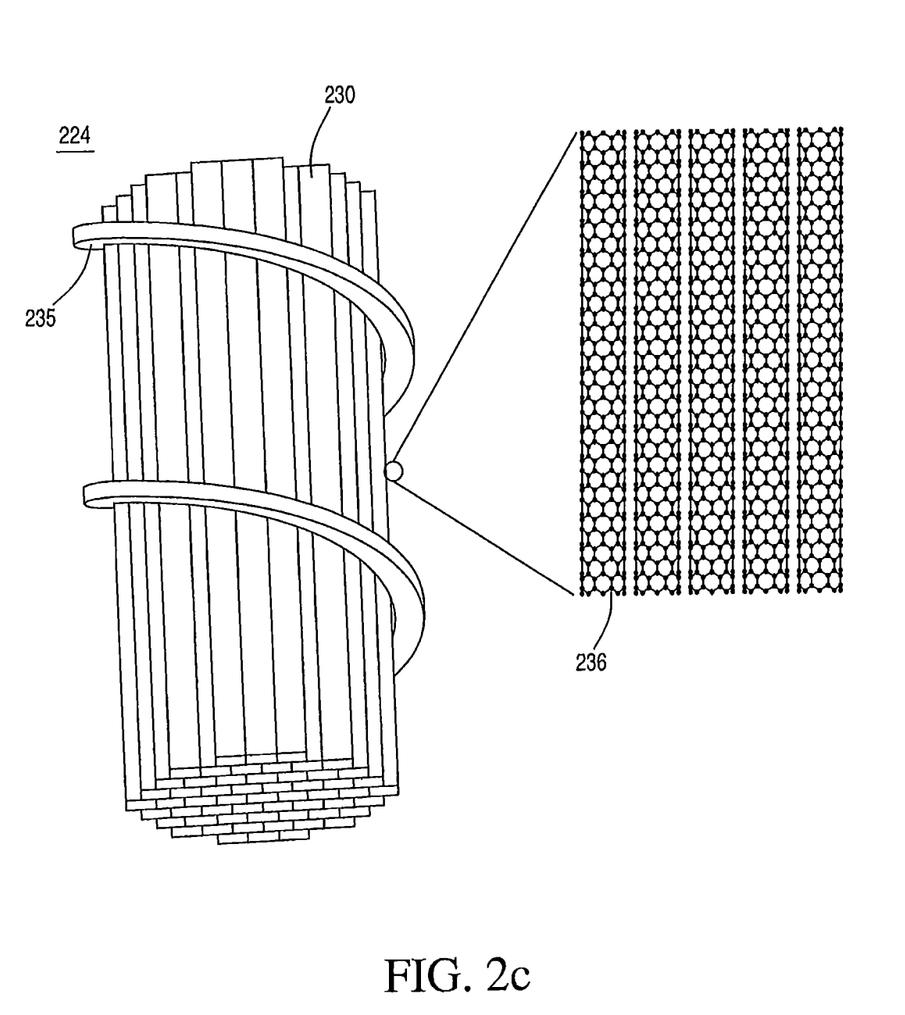
FIG. 2c shows an enlarged, close-up view of carbon-fiber bundles in at least one of the component layers of an S-bracket.

Individual links 222 and 224 may preferably comprise metals such as, for example, steel, titanium, aluminum or polymer or carbon fibers. The link may also preferably comprise carbon nanotube-containing materials as shown in FIG. 2*c*. In FIG. 2*c*, a portion of link 224 is shown, where the link is shown comprising bundles of nanofiber arrays 230. The bundles of nanofiber arrays are shown having an overwrap of a small fiber 235. The nanofiber arrays 230 comprise a set of single-walled carbon nanotubes (SWCNTs) 236 or a set of any other nanofiber. Wrap fiber 235 may comprise a similar array of nanotubes 236, or may comprise a single fiber of a polymer, glass, carbon fiber, or combinations thereof, etc. The second (middle) layer shown as 240 (FIG. 2*a*) preferably comprises a woven layer of fibers. The fibers preferably comprise Kevlar®, glass, carbon fiber, CNTs, or combinations thereof, etc. The weave pattern is preferably any standard pattern used in the fiber and fiber-composite industry.

Figure 2D:
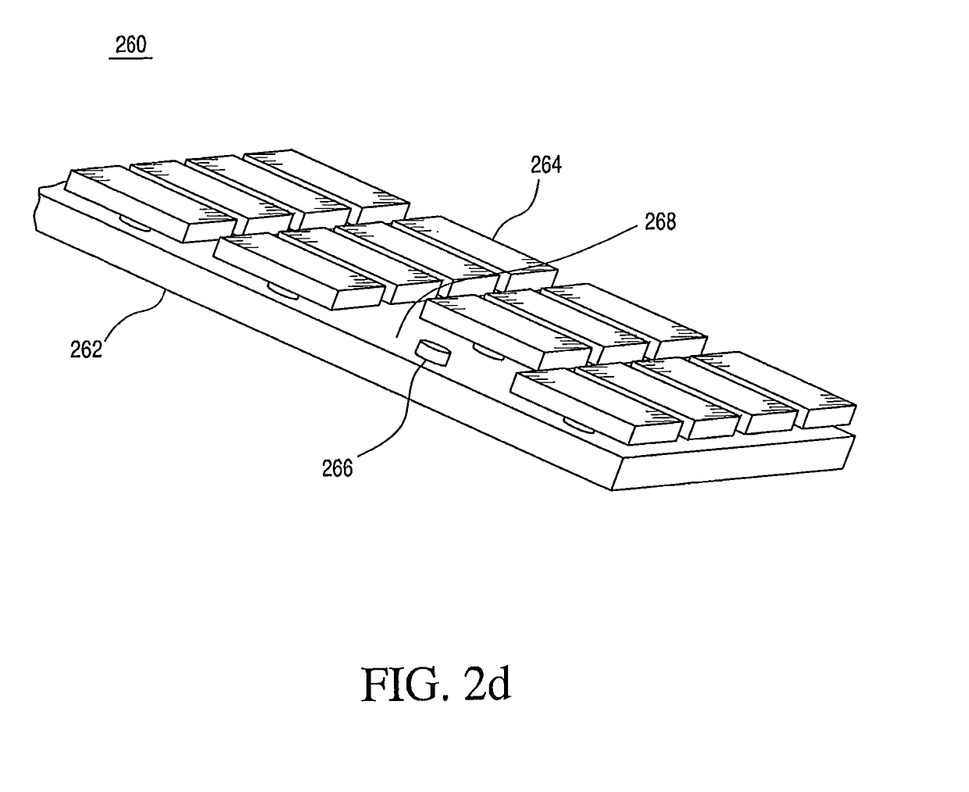
FIG. 2d shows an enlarged, close-up view of a component layer of an S-bracket showing an array of ablative plates.

A detail of a preferred portion of third layer 226 is shown in FIG. 2*d*. The third layer 260 comprises a substrate sheet 262, an array of hard, ablative plates 264, and an attachment means 266 to adhere ablative plates 264 to substrate sheet 262. The ablative plates 264 are preferably mounted on the inward facing surface 268 of substrate sheet 262. Each ablative plate 264 is preferably attached to substrate sheet 262 by one or more attachment means 266. The ablative plate 264 can comprise any of the earlier disclosed ceramics. Substrate 262 preferably comprises a metal such as, for example, steel, titanium, aluminum, or any solid plastic, or a fiber composite, etc. The attachment means 266 can be any adhesive that bonds the plate to the substrate.

It should be understood that multiple layers can be used to create a thicker S-bracket element. For example, a 5-layer configuration could consist of (1) an ablative layer on the side facing the flywheel, (2) woven layer, (3) chain-and-braid layer, (4) woven layer, and (5) chain-and-braid layer.

Figure 3:
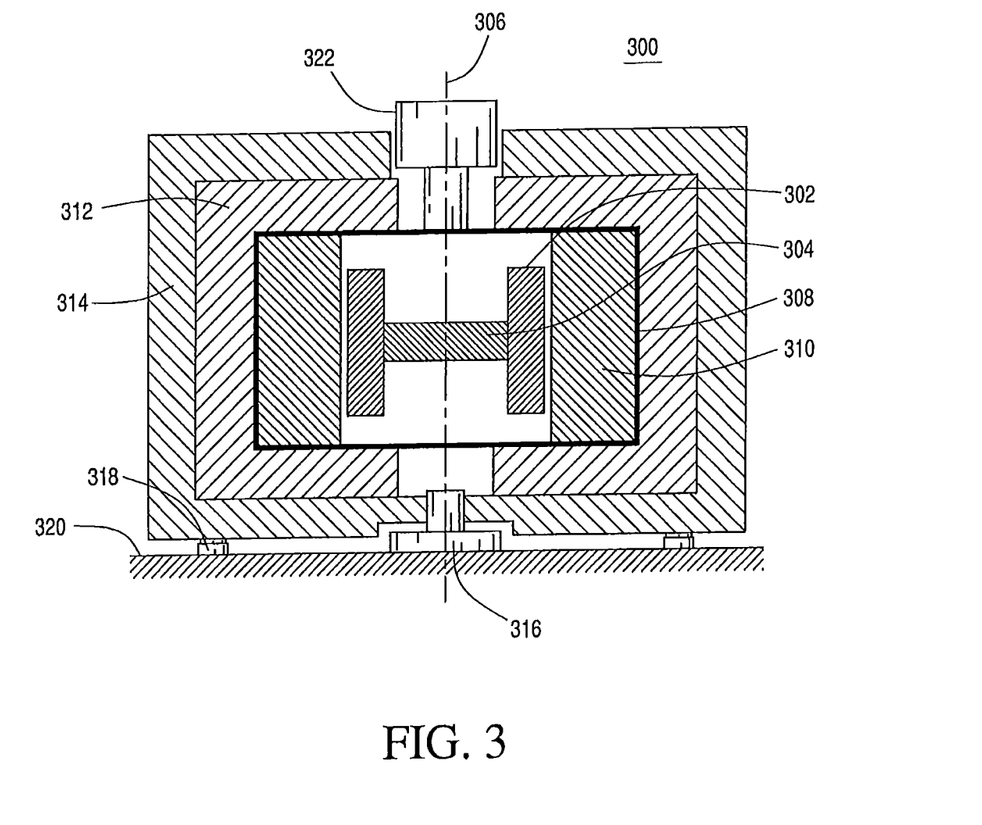
FIG. 3 is a schematic cross-sectional view of showing a flywheel assembly including the containment layer.

A further variation is shown in FIG. 3, which represents a cross section of a flywheel energy storage containment system. System 300 comprises a flywheel rotor 302, which may optionally have a hub 304, although the present disclosure is also importantly incorporated into the open-core flywheel architectures described herein, and which are hubless. The flywheel has various stationary support components that are not shown in the figure. The flywheel rotor 302 (and hub 304) rotates about a centerline 306. Vacuum barrier 308 is shown in a heavy dark and thick line. S-bracket assembly 310 is shown positioned within a thermal insulating layer 312 that may not be drawn to scale. An optionally rotatable mechanical layer 314 is shown that may optionally contain a structure to further impede external projectiles traveling inward from reaching the vacuum boundary. Mechanical bearing 316 helps keep the rotatable layer 314 centered. Mechanical bosses 318 are preferably positioned between layer 314 and support or ground 320. Both bearing 316 and bosses 318 are optionally mechanically connected to the ground. Finally, a pressure relief component 322 is shown in the center of the assembly.

Insulating layer 312 preferably withstands high temperatures of from about 1000° C. to about 2500° C., and preferably has a low thermal conductivity less than about 0.4 W/m·k. Materials used in the manufacture of fire bricks in kilns can be used for this layer, for example. However, for mobile and particularly vehicular applications, lighter-weight material may be used, such as, for example, silica, alumina, mullit, sillimanite, magnesia, zirconia, and fibrous refractory insulation tiles, with a combination of alumina-zirconia-silica being particularly preferred. Rotatable layer 314 may comprise a composite-containing internal structure but preferably has an outer layer comprising steel. Bearing 316 is preferably a ceramic bearing, and bosses 318 can be bronze or other metal, etc., that has a relatively low coefficient of friction with steel.

Figure 4:
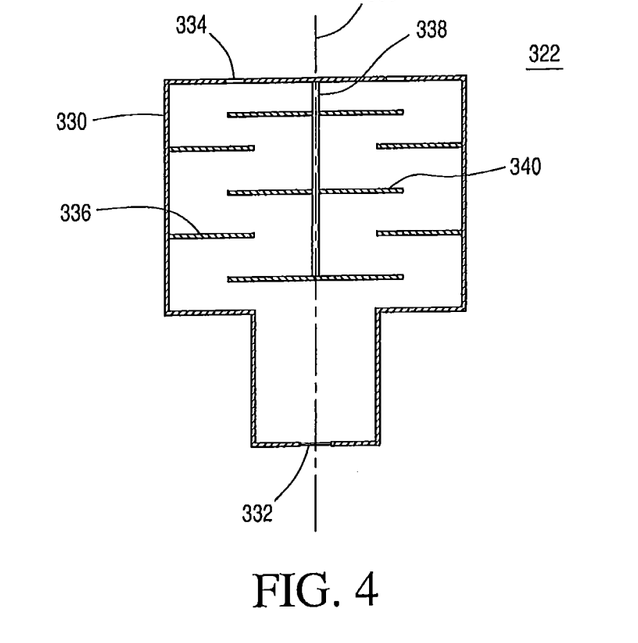
FIG. 4 is a close-up, cross-sectional view of the pressure relief component of the flywheel assembly shown in FIG. 3.

The structure of pressure relief component 322 is shown in further cross-sectional detail in FIG. 4. Pressure relief component 322 is concentric about centerline 306, and has outer body 330. On the bottom surface of body 330, there is a pressure relief component 332, such as, for example, a burst disk. The purpose of pressure relief component 332 is to predictably break at pressures above a certain value and allow gas and small particles to escape through exit holes 334 located in the top surface of body 330. Relief component 322 also has baffle annular disks 336 attached to the outer wall of body 330. It has a central post 338 attached to the upper surface of body 330. There are one or more disk baffles 340 attached to central post 338. The baffles serve to decelerate the gas and particle flows before reaching the exit holes 334.

Figure 5:
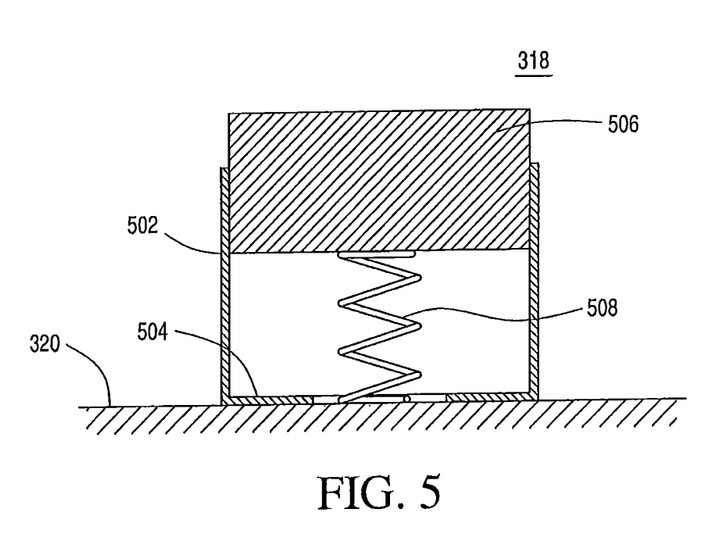
FIG. 5 is a close-up, cross-sectional view of a stabilizing boss element of the flywheel assembly shown in FIG. 3.

The boss element 318 (as shown in FIG. 3) may have detail, as shown in FIG. 5. Element 318 comprises a support structure with substantially cylindrical side walls 502 and bottom disk 504, which may be an annular disk. The bottom part of the support structure is attached to the support/ground 320. The cylinder 506 fits within the walls 502. Spring 508 pushes the cylinder 506 upward into firm contact with the bottom of rotatable layer 314 (FIG. 3). The rotatable layer may wear away cylinder 506 during rotation, and the spring force will keep in contact and provide upward support, helping to dissipate the rotational motion.

In the event of internal flywheel failure creating an outward force, in containing flywheel rotor debris, the S-brackets deform as described above to form a substantially toroidal containment chamber. According to variations of the present disclosure, the debris circulates in the substantially toroidal cavity produced by the deformation of the S-brackets. The ablative particle-containing layer or layers, preferably contained in the S-brackets, have several functions. First, they help to break up rotor debris into finer dust-like particles. Second, they may be designed and selected to chemically react endothermically with the carbon fibers and plastic polymers to further reduce the temperature of the debris cloud. For example, the attachment means 266 as shown in FIG. 2d could at least partially comprise a compound such as ethylene propylene diene monomer.

As the kinetic energy of the rotor debris is changed into thermal energy, the temperature of the components within the chamber rise. Any plastic polymer used in the rotor composite will gasify. Gas pressure will build in the chamber. At some predetermined point, a pressure relief component comprising a device, such as, for example, a seal or rupture disk, etc., will, by design, fail. The gas at the center of the chamber may exit through the baffled structure at a predetermined and relatively controlled rate into the environment, for example, in the form of a sooty ash, etc. Initially, there will still be a rotating flow, and the centrifugal force of the flow will keep most of the dust and gas in the substantially toroidal part of the deformed S-bracket containment layer. As the rotation slows down, more gas and dust will be able to exit the chamber.

Angular momentum of the flywheel rotor will be conserved. The angular velocity of the debris cloud will decrease as the cloud expands outward, and the initial glancing collisions with the brackets will keep most of the momentum in the cloud. However, the collisions will transfer some torque to the brackets, and this will cause the brackets, thermal insulation, and rotatable layer to turn. Because of the larger radius of this structure and its considerable mass, the angular velocity will be small, and this angular momentum can be dissipated in the bosses 1190 and bearing 1180.

Useful stationary and mobile applications for the flywheel systems of the present disclosure abound. Indeed, any required need for sustainable energy storage and deployment would find use and benefit from the present disclosure. For example, due to the substantially silent operation of the flywheel systems of the present disclosure, vehicular operation in silent or stealth modes are made possible. In addition, the presently disclosed systems allow for rapid charging and discharging, as well as charging from all available energy sources such as, for example, grids, renewables, generators, etc. Further, no unique tooling or infrastructure is required to incorporate the variations of the present disclosure into stationary energy storage or generation facilities, as well as devices, systems or vehicles requiring uninterruptable and interruptible energy storage or deployment in mobile and stationary operation. Preferred vehicles include, but are not limited to manned and unmanned aircraft, spacecraft, terrestrial and water-borne surface and sub-surface vehicles. The modular approach to the open-core architecture design of the variations disclosed reduce the risk of total system failure and further enable a deeper depth of energy discharge (e.g. greater than about 95%) as compared to known flywheel systems. In addition, the systems allow for the very precise determination of charge based only upon monitoring the flywheel rotational speed.

While the preferred variations and alternatives of the present disclosure have been illustrated and described, it will be appreciated that various changes and substitutions can be made therein without departing from the spirit and scope of the disclosure. Accordingly, the scope of the disclosure should only be limited by the accompanying claims and equivalents thereof.

We claim:

1. A containment layer for a flywheel apparatus comprising:
   a substantially cylindrical chamber comprising an inner wall and an outer wall; and
   a plurality of deformable brackets attached to at least one of the inner and outer chamber wall, said brackets oriented to predictably deform upon an impact, said brackets each having at least one surface for containing an impact, with said brackets comprising multiple layers, wherein at least one layer comprises ablative particles.

2. The containment layer of claim 1, wherein the bracket surface for containing an impact provides a glancing angle in the direction of an impact of from about 0.1° to about 5°.

3. The containment layer of claim 1, wherein the layer substantially surrounds a flywheel apparatus, said apparatus comprising at least one rotor rotating at a velocity of from about 300 m/s to about 3000 m/s.

4. The containment layer of claim 1, wherein the brackets are S-shaped, and the brackets plastically deform in a radially outward direction in response to an outward impact.

5. The containment layer of claim 1, wherein the brackets predictably deform upon impact to create a substantially toroidal cavity in the chamber.

6. The containment layer of claim 1, wherein at least one bracket layer is a woven layer comprising a material selected from the group consisting of: glass-containing fibers, carbon-containing fibers, or combinations thereof.

7. The containment layer of claim 6, wherein the carbon-containing fibers are carbon nanotube-containing fibers.

8. The containment layer of claim 1, wherein at least one bracket layer comprises an array of interconnected links, said links made from a material selected from the group consisting of: steel, titanium, aluminum, polymer fibers, carbon fibers, and combinations thereof.

9. The containment layer of claim 8, wherein the carbon fibers comprise carbon nanotube-containing fibers.

10. The containment layer of claim 1, wherein at least one layer of the bracket comprises at least one of ablative plate.

11. The containment layer of claim 1, wherein the containment layer has an axial height that is greater than the axial height of the flywheel apparatus.

12. A vehicle comprising the containment layer of claim 1.

13. A flywheel assembly for storing and releasing energy comprising:
   at least one substantially cylindrical rotor assembly within a vacuum chamber, said assembly comprising a rotor having an inner and outer surface;
   a stator assembly positioned in close proximity to the rotor assembly;

at least one rotor magnet affixed to the inner surface of the rotor;

at least one stator magnet affixed to the stator; and a containment layer substantially surrounding the rotor assembly, said containment layer comprising a plurality of deformable brackets oriented to contain an impact, said brackets each having a surface for containing debris from a flywheel assembly failure, and wherein said brackets comprise multiple layers and at least one layer comprises ablative particles.

14. The flywheel assembly of claim 13, wherein the surface for containing an impact provides a glancing angle in the direction of an impact of from about 0.1° to about 5°.

15. The flywheel assembly of claim 13, wherein the flywheel apparatus comprises at least one rotor rotating at a velocity of from about 300 m/s to about 3000 m/s, and the brackets deform at a rate less than the velocity of the rotor.

16. The flywheel assembly of claim 13, wherein the brackets have a tensile strength of from about 2 GPa to about 20 GPa.

17. The flywheel assembly of claim 13, wherein the brackets are S-shaped, and the brackets comprise a midsection that plastically deforms predictably in a radially outward direction in response to an outward impact.

18. The flywheel assembly of claim 13, wherein the brackets substantially deform to create a substantially toroidal cavity in the containment layer.

19. The flywheel assembly of claim 13, wherein the brackets are made from a material selected from the group consisting of: carbon fiber-containing material, glass fiber-containing material, metal-containing material, and combinations thereof.

20. The flywheel assembly of claim 19, wherein the carbon-fiber containing material is a carbon nanotube-containing material.

21. An energy storage facility comprising the flywheel assembly of claim 13.

22. A method for containing flywheel rotor debris from a damaged flywheel assembly comprising the steps of:

providing a substantially cylindrical flywheel rotor assembly and flywheel stator assembly within a vacuum chamber, providing a plurality of rotor magnets affixed to the inner surface of each rotor;

providing a plurality of stator magnets affixed to each stator; and providing a containment layer surrounding the rotor assembly, said containment layer comprising a series of deformable brackets oriented to contain an impact, said brackets each comprising a plurality of layers, with at least one layer comprising ablative particles.

23. The method of claim 22, wherein the brackets are S-shaped, and the brackets plastically deform predictably in a radially outward direction in response to an outward impact to create a concave interior surface.

24. The method of claim 23, wherein the brackets substantially deform to create a substantially toroidal cavity.

25. The method of claim 22, wherein at least one bracket layer comprises a material selected from the group consisting of: carbon fiber-containing material, glass fiber-containing material, metal-containing material, and combinations thereof.

26. The method of claim 25, wherein the carbon-fiber containing material is a carbon nanotube-containing material.

* * * * *